United States Patent [19]

Cosby et al.

[11] Patent Number: 5,515,640
[45] Date of Patent: May 14, 1996

[54] TACKLE BOX AND METHOD

[75] Inventors: David D. Cosby; William Jarvi, both of Tulsa; Larry W. Henry, Poren; Robert L. Carpenter, Tulsa, all of Okla.

[73] Assignee: Brunswick Corporation, Lake Forest, Ill.

[21] Appl. No.: 277,471

[22] Filed: Jul. 19, 1994

[51] Int. Cl.⁶ ............................................. A01K 97/06
[52] U.S. Cl. ........................................ 43/25.2; 43/54.1
[58] Field of Search ............................. 43/25.2, 54.1, 43/57.1, 25; 206/315.11, 362.2; 220/347

[56] References Cited

U.S. PATENT DOCUMENTS

| | | | |
|---|---|---|---|
| D. 263,519 | 3/1982 | Ader | D2/406 |
| 2,767,502 | 10/1956 | Reynolds | 43/25.2 |
| 2,878,610 | 3/1959 | Herstedt | 43/25.2 |
| 3,987,574 | 10/1976 | Dennino | 43/54.1 |
| 4,139,096 | 2/1979 | Sieger | 206/315 |
| 4,203,245 | 5/1980 | Peterson | 43/25.2 |
| 4,452,003 | 6/1984 | Deutsch | 43/25.2 |
| 4,920,683 | 5/1990 | Weber | 43/25.2 |
| 5,020,264 | 6/1991 | Demski | 43/25.2 |
| 5,079,863 | 1/1992 | Gillespie | 43/54.1 |
| 5,169,018 | 12/1992 | Fiore | 220/318 |
| 5,176,281 | 1/1993 | Fiore | 220/520 |
| 5,209,009 | 5/1993 | Fast | 43/54 |
| 5,220,742 | 6/1993 | Lewis | 43/25.2 |
| 5,226,553 | 7/1993 | Fiore | 220/318 |
| 5,277,306 | 1/1994 | Sargent | 43/25.2 |
| 5,297,676 | 3/1994 | Coleman | 206/315 |
| 5,371,968 | 12/1994 | Casey | 43/25.2 |

FOREIGN PATENT DOCUMENTS

| | | |
|---|---|---|
| 732817 | 4/1966 | Canada. |
| WO9210931 | 7/1992 | WIPO. |

*Primary Examiner*—Kurt Rowan
*Attorney, Agent, or Firm*—Baker & Botts

[57] ABSTRACT

Apparatus for releasably attaching a tackle box (20) to a fishing pole (22) with the tackle box (20) being held in a desired position relative to the fishing pole (22). The tackle box (20) may include a container (34) a lid (63), and a handle (80). A channel (30) may be formed in one surface (32) of container (34) to releasably attach to the pole (22). The rotation of the tackle box (34) about the pole (22) may be prevented by a retainer (28). Methods of manufacturing and using a tackle box (20) are also presented.

19 Claims, 2 Drawing Sheets

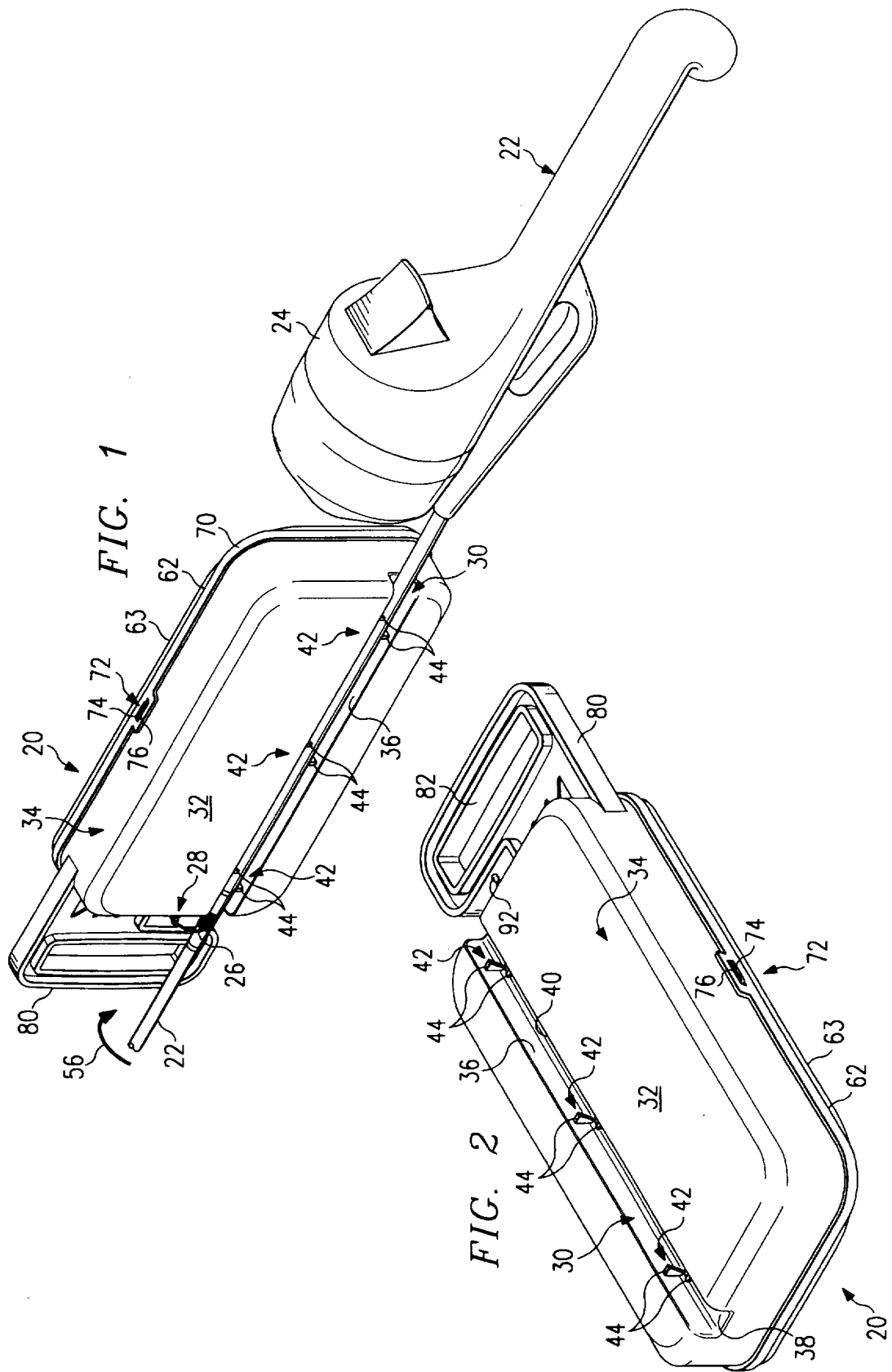

TACKLE BOX AND METHOD

RELATED APPLICATION

This application is related to design application Ser. No. 08/26122 filed Jul. 19, 1994 entitled Snap-On Tackle Box U.S. Des. 360,015.

TECHNICAL FIELD OF THE INVENTION

This invention relates generally to fishing equipment, and more particularly, to a tackle box that may be attached to a fishing rod.

BACKGROUND OF THE INVENTION

When going fishing, there are numerous items that a fisherman should take with him or her. For example, numerous hooks, sinkers, lines, lures, floats, etc. are frequently taken along on the outing. A tackle box is a convenient way to organize these items and to take them on the trip. In storing and in transporting the fishing equipment, it may be desirable to have the fishing pole and tackle box as a single unit. Once the fishing equipment is transported to the place where the fisherman will fish, equipment should be set up and should be relatively unencumbered to allow the fisherman to cast as may be necessary.

Children frequently like to play by simulating activities engaged in by adults and older children, and fishing is no exception. Children thus often use a toy fishing pole with a safety hook that allows the child to pretend that he or she is fishing. To simulate the reality of the fishing expedition, the child may also enjoy having a tackle box to accompany the fishing rod. In providing such products, however, the parents who must pick up after their children would like items that are easily stored and put away, and retailers who sell such toys would like items that are likewise easily stored and aesthetic in their retail presentation.

Therefore, a need has arisen for a tackle box which is easily and readily secured to a fishing pole, and yet is easily detached from the pole upon arrival at the fishing location. Similarly, a need has arisen for a tackle box that is convenient to store along with the fishing rod or pole. Also, a corresponding need has arisen for a tackle box that is suitable for use with a toy fishing rod to allow convenient storage and retail presentation.

SUMMARY OF THE INVENTION

In accordance with the present invention, disadvantages and problems of storage and transportation of tackle boxes with fishing poles have been substantially reduced or even eliminated by use of the present tackle box and method of attaching the tackle box to a fishing pole or rod. According to one aspect of the present invention, a tackle box is provided that mounts onto a fishing pole having a line guide that includes an openable container having a channel formed therein for receiving a portion of the fishing pole. A clamping device for releasably attaching the fishing pole in the channel may be provided along with a retainer for preventing rotational movement of the tackle box with respect to the fishing pole. The retainer may abut the line guide of the fishing pole.

According to another aspect of the present invention, a method for releasably attaching a tackle box to a fishing pole is provided that includes the steps of: forming a channel on a portion of the tackle box for inserting the fishing pole; attaching a clamping device in the channel for releasably attaching the fishing pole to the tackle box; and attaching a retainer for preventing rotational movement of the tackle box with respect to the fishing pole.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a perspective view of a tackle box releasably attached to a fishing pole according to an aspect of the present invention;

FIG. 2 is a perspective view of a tackle box according to an aspect of the present invention;

DETAILED DESCRIPTION OF THE INVENTION

Figure 3:
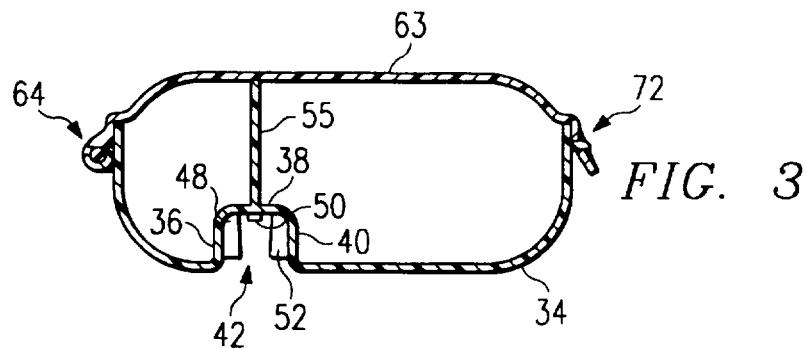
FIG. 3 is a cross-sectional view of a tackle box according to one aspect of the present invention.
Figure 4:
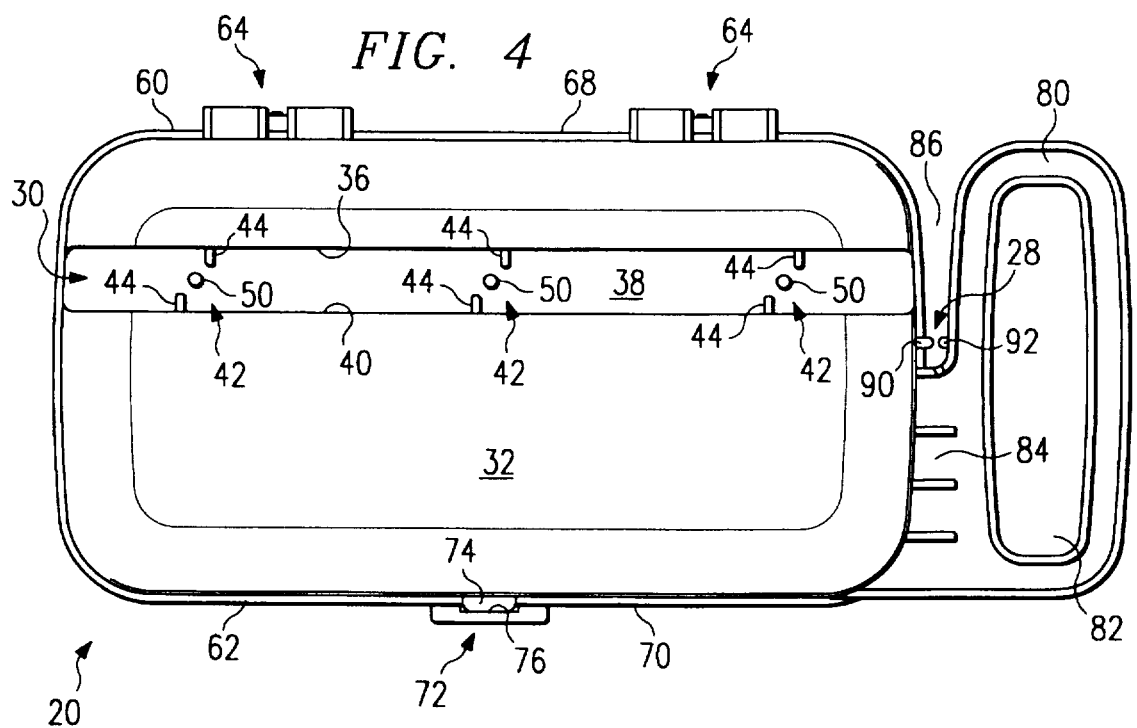
FIG. 4 is a bottom plan view of a tackle box according to an aspect of the present invention.

The preferred embodiments of the present invention and its advantages are best understood by referring to FIGS. 1–5 of the drawings, like numerals being used for like and corresponding parts of the various drawings.

Referring to FIG. 1, tackle box 20 is shown with fishing pole or rod 22 (which has reel 24) secured in channel 30 by clamping devices 42. A retainer 28 is coupled to tackle box 20 so that it prevents rotation of tackle box 20 with respect to fishing pole 22. Tackle box 20 thus allows easy one-piece storage or retail display of fishing pole 22 and tackle box 20.

Tackle box 20 is shown releasably attached to a fishing pole, or rod 22, which includes reel 24 and one or more line guides or eyelets 26. Tackle box 20 and its associated components may be formed from a lightweight plastic. Tackle box 20 may be releasably attached to fishing pole 22 as shown is FIG. 1 during storage, transportation, or for purposes of retail presentation. To prevent tackle box 20 from rotating about fishing pole or rod 22, retainer 28 may be associated with line guides 26. Channel 30 may be formed on first surface 32 of container or body 34 of tackle box 20. In one embodiment, channel 30 is formed by a first channel sidewall 36, a second channel sidewall 38, and a third channel sidewall 40 (see FIG. 3).

Referring now to FIGS. 1–4, a plurality of releasably clamping devices 42 may be attached in channel 30 to releasably hold pole 22 in channel 30. Each clamping device 42 may include, for example, a pair of deformable ribs 44 offset longitudinally from each other. A spacer or rib 50 may also be included to space pole 22 a predetermined distance from the back wall of channel 30. Clamping device 42 may include numerous types of clamps or other devices for releasably securing pole 22 in channel 30. In the preferred embodiment, three clamping devices 42 are included with each clamping device including a pair of deformable ribs 44. Examples of clamping devices 42 may be seen in FIG. 4. The clamping device in one embodiment (FIG. 3) includes first deformable rib 48 that is attached to channel sidewall 36, second deformable rib or spacer 50 that is attached to second channel sidewall 38, and third deformable rib 52 that is attached to channel sidewall 40. Ribs 44, 48, 52 may be angled with respect to the channel side walls 36 and 40 to require greater forces during entry and removal of pole 22.

When rod or pole 22 is placed in channel 30, ribs 48 and 52 temporarily deform to allow fishing pole 22, which has a larger diameter than the clearance between deformable ribs 48 and 52, to be inserted and held in place. The forces seeking to restore ribs 48 and 52 to their original, undeformed position cause a wedging action as well as a frictional force that holds fishing pole 22 in channel 30 with a "snapping action." Third rib 50 is primarily for spacing. Thus, it can be seen that pole 22 may be snapped into channel 30 and held by clamping devices 42, but without more, tackle box 20 may rotate with respect to pole 22 as shown, for example, by arrow 56 (FIG. 1). The rotation of tackle box 20 is particularly a problem for retailers who desire to efficiently use shelf or floor space and also to present an aesthetically appealing display and retainer 28 may be provided to prevent rotation.

Container or body 34 of tackle box 20 may take many shapes and sizes. In one embodiment, tackle box 20 may be formed as an openable container with container body 34, which is a receptacle for play lures (if used as a toy) or actual lures (if used with real fishing equipment). Any number of compartments may be formed within container 34; for example, partitioning wall 55 may divide the inner compartment of container 34 into two sections. Container or body 34 has a first edge 60, a second edge 62, and a lid 63 that may attach to container 34 with hinges 64. Hinges 64 may include any number of hinges attached along first edge 68 of lid 63 and first edge 60 of container 34. Hinges 64 allow lid 63 to pivot about its first edge 68 so that it may be opened. Along second edge 70 of lid 63 and second edge 62 of container 62 may be a lock or latch 72. Latch 72 may include any combination of elements to hold lid 63 to container 34 so that it may be selectably opened and closed. Latch 72 may include, for example, a locking tab 74 formed as part of or attached to second edge 62 of container 34 and a matching locking slot 76 formed along second edge 70 of lid 63.

Tackle box 20 may also include handle 80. Handle 80 may be formed as an integral part of or attached to container 34 or lid 63. Handle 80 has an opening 82 for the fisherman's hand. Handle 80 may have a neck portion 84 extending from a portion of container body 34 or lid 63 to create a second channel 86. As previously mentioned, retainer 28 of tackle box 20 may be provided.

Figure 5:
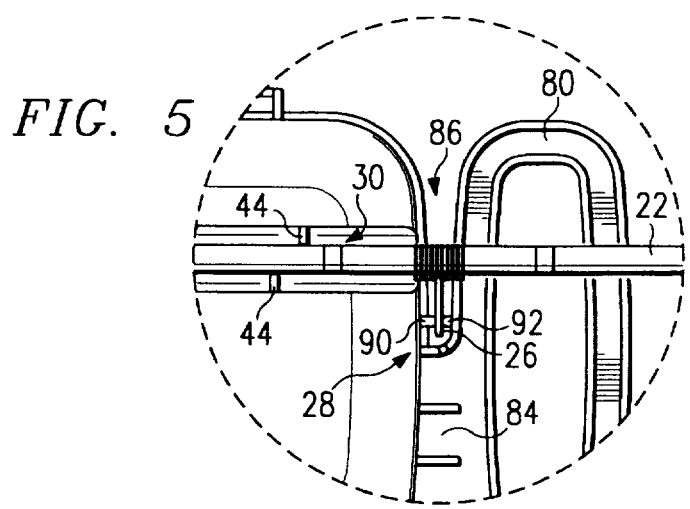
FIG. 5 is an enlarged drawing with portions broken away of a portion of the tackle box of FIG. 4.

Referring to FIG. 5, retainer 28 may be, for example, a pair of deformable tabs 90 and 92. First tab 90 may protrude from an edge of container 34, and second deformable tab 92 may protrude from a portion of handle 80 opposite from first tab 90. The clearance between the ends of deformable tabs 90 and 92 is preferably sized to be less than the thickness of the ring that forms line guide 26. In an alternative embodiment, one deformable tab may extend almost completely across channel 86 such that when line guide 26 is rotated into channel 86 near the deformable tab, the tab will snap into line guide 26 and prevent rotation of rod 22 relative to tackle box 20.

In operation, the actual or toy lures may be placed within tackle box 20 and lid 63 closed and held shut by latch 72. Fishing pole 22 may be placed into channel 30 of tackle box 20 such that channel 30 will be disposed between first line guide 26 and reel 24. Tackle box 20 is preferably pressed onto fishing pole 22 with sufficient force to cause deformable ribs 44 to deform about pole 22 and to releasably secure tackle box 20 to fishing pole 22 with a type of interference fit. Tackle box 20 may then be rotated to move line guide 26 into second channel 86 to a point where retainer 28 snaps onto or mates with line guide 26 and thereby temporarily secures tackle box 20 in the desired position relative to fishing pole 22. Thus, tackle box 20 and fishing pole 22 may be conveniently and aesthetically stored, displayed or transported.

Although the present invention has been described in detail, it should be understood that various changes, substitutions, and alterations can be made herein without departing from the spirit and scope of the invention as defined by the appended claims.

What is claimed is:

1. A tackle box for mounting onto a fishing pole having a line guide, the tackle box comprising:

an openable container having an external surface;

a channel formed on the external surface of the container for receiving a portion of the fishing pole;

a clamping device for releasably attaching the fishing pole in the channel; and a retainer associated with the container for abutting the line guide for preventing rotational movement of the tackle box with respect to the fishing pole.

2. The tackle box of claim 1 further comprising a handle and wherein the retainer comprises a first deformable tab and a second deformable tab, each tab configured to mate with the line guide, the first tab attached to the container and the second tab attached to the handle.

3. The tackle box of claim 1 further comprising a handle and wherein the retainer comprises a deformable tab attached to the handle and formed to mate with the line guide.

4. The tackle box of claim 1 wherein the retainer comprises a pair of deformable tabs configured to mate with the line guide and attached to the container.

5. The tackle box of claim 1 wherein the retainer comprises a deformable tab configured to mate with the line guide and attached to the container.

6. The tackle box of claim 1 wherein the openable container comprises:

a rigid container body;

a lid having a first and second edge; and a hinge for attaching the first edge of the lid to the container body and allowing the lid to pivot with respect to the hinge means.

7. The tackle box of claim 6 wherein the container further comprises a latch for releasably holding the second edge of the lid to the container.

8. The tackle box of claim 6 further comprising a handle attached to the container.

9. A tackle box for mounting onto a fishing pole having a line guide, the tackle box comprising:

an openable container;

a channel formed on the container for receiving a portion of the fishing pole;

a clamping device for releasably attaching the fishing pole in the channel;

a retainer associated with the container for abutting the line guide for preventing rotational movement of the tackle box with respect to the fishing pole; and wherein the clamping device comprises a plurality of ribs attached in the channel.

10. The tackle box of claim 9 wherein the clamping device comprises a plurality of deformable ribs disposed in the channel to form an interference fit with the fishing pole when inserted therein.

11. A method of manufacturing a tackle box for releasable attachment to a fishing pole having a line guide comprising the steps of:

forming a channel on one surface of the tackle box for inserting the fishing pole therein;

providing a plurality of ribs in the channel for releasably attaching the fishing pole to the tackle box; and providing a retainer for preventing rotational movement of the tackle box with respect to the fishing pole that abuts with the line guide of the fishing pole.

12. The method of manufacturing a tackle box as described in claim 11 wherein the step of providing a retainer comprises the step of forming deformable tabs on the tackle box adjacent to the channel that mates with the line guide of the fishing pole.

13. The method of manufacturing a tackle box described in claim 11 wherein the step of attaching a retainer comprises the step of attaching a deformable tab to the tackle box that mates with the line guide of the fishing pole.

14. A method of attaching a tackle box having an external surface to a fishing pole comprising the steps of:

inserting the fishing pole into a channel on the external surface of the tackle box;

releasably retaining the fishing pole in the channel with clamping devices; and abutting a retainer on the tackle box with a line guide to prevent rotation.

15. The method of claim 14 wherein the step of preventing rotation comprises twisting the pole in the channel to cause a tab on the tackle box to abut with a line guide on the fishing pole.

16. A tackle box for being attached to a fishing pole, the tackle box comprising:

an openable container;

a channel formed on the container for receiving a portion of the fishing pole;

a plurality of clamping devices for releasably attaching the fishing pole in the channel; and wherein each of the plurality of clamping devices comprises:

a first rib attached to the channel, and a second rib attached to the channel proximate the first rib for creating an interference fit with the portion of the pole when inserted in the channel.

17. The tackle box of claim 16 wherein the second rib is longitudinally offset from the first rib.

18. The tackle box of claim 16 further comprising a spacer attached to the channel for spacing the fishing pole a predetermined distance from a channel wall.

19. A tackle box that mounts onto a fishing pole having a line guide, the tackle box comprising:

an openable rigid container comprising:

a container body having an external surface, a lid having a first and second edge, a hinge for attaching the first edge of the lid to the container body and allowing the lid to pivot with respect to the hinge, a latch for releasably holding the second edge of the lid to the container, and a handle attached to the container;

a channel formed on the external surface of the container body for receiving a portion of the fishing pole therein;

a retainer attached to the rigid container to prevent rotational movement of the tackle box with respect to the fishing pole; and a plurality of deformable tabs longitudinally offset from each other and attached to the container for releasably attaching the fishing pole in the channel.

* * * * *